United States Patent Office 3,087,377
Patented Apr. 30, 1963

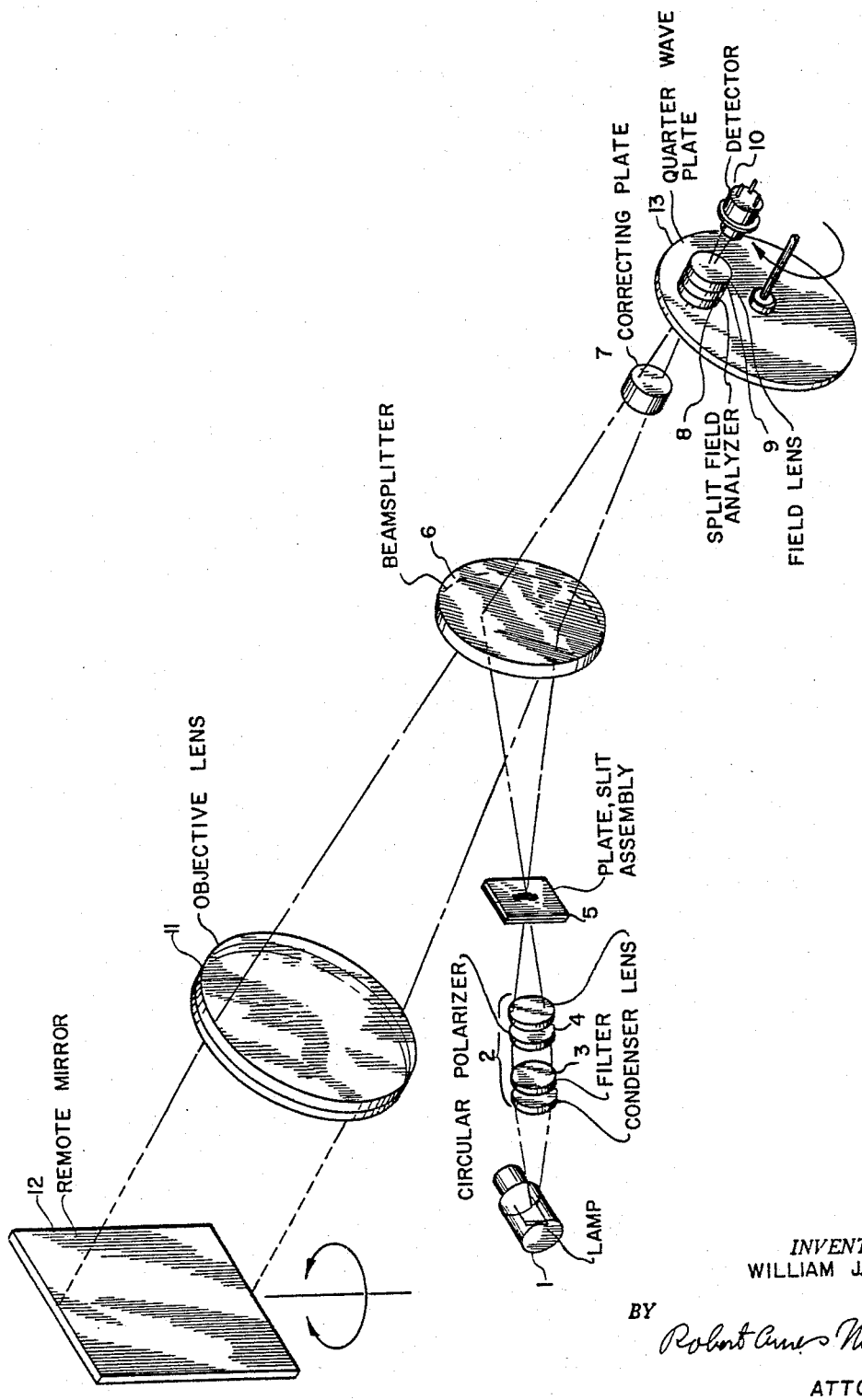

3,087,377
POLARIZED LIGHT AUTOCOLLIMATOR
William J. Daley, Ridgefield, Conn., assignor to Barnes Engineering Company, Stamford, Conn., a corporation of Delaware
Filed July 7, 1960, Ser. No. 41,389
4 Claims. (Cl. 88—14)

This invention relates to an improved autocollimator utilizing polarized light.

The autocollimator is a precision instrument for detecting very small changes in angular rotation of a reflective element which may be a mirror, retroflecting prism or other similar optical element. For a number of purposes it is important to be able to measure with great precision the angular rotation of the rotatable reflecting element. Essentially the autocollimator, which is usually aimable, includes a light source, means for transforming the light from the light source into a collimated beam which leaves the instrument, strikes the external reflecting element and is reflected back into the instrument. The path of the beam from the autocollimator to the external reflecting element may be direct or may be folded by suitable mirrors or prisms. The operation is, of course, identical but as will be pointed out below a serious defect of autocollimators using polarized light is accentuated when auxiliary mirrors or prisms are present.

The optics of the autocollimator image the reflected, and still collimated beam, onto a suitable surface and light detecting means are provided in the surface which measure movement of the image of a collimated beam due to angular movement of the reflective element. The light detector transforms the information into usable signals, usually electrical, which may be used either as indicators or to operate suitable servo mechanisms to bring back the reflective element into precise alignment.

The most effective practically used autocollimators employ polarized light and it is with this type of autocollimator that the present invention deals. The first proposal, in a complicated form, is described in the patent of Palmer 2,651,771. In this patent light from a light source strikes the angularly movable external reflecting element and the reflected beam passes through two polarizers which produce plane polarized light the direction of the planes of polarization being different. The beam then passes through a rotating plane polarizer and strikes a light detector in the form of a phototube. A second beam strikes a fixed mirror and passes through a third polarizer which plane polarizes at still a different orientation, and this third beam then passes through the opposite edge of the rotating polarizer and finally strikes a second phototube. The auxiliary beam produces an electrical signal alternating in one particular phase and the beam reflected from the movable element produces a similar alternating signal in a different phase depending on which one of the two fixed polarizers the beam traverses. In other words, rotation of the reflective element results in the reflected beam passing through one or the other polarizer and hence determines its phase. When exactly aligned it passes uniformly through both polarizers and there is no signal. The device of the Palmer patent has been modified for practical purposes by placing the rotating polarizer between the light source and the reflective element and placing the phototube in back of an ordinary split field analyzer. The auxiliary beam from the fixed mirror is eliminated though its function is not. Rotation of the reflective element moves the beam across the split field analyzer and produces a signal in one phase or another or no signal at all if the beam is exactly centered.

Polarized light autocollimators are practical instruments but they have a serious drawback when extreme precision is necessary. In the Palmer device the unpolarized light beam striking the reflective element is somewhat polarized therefrom and, therefore, even if the beam is perfectly centered on the two polarizers there will not be a null signal because the plane polarization resulting from reflection produces output signals that are exactly the same as if there had been no polarization but the beam had been slightly displaced so that more of the beam was passing through one polarizer than the other. In other words, the instrument gives a reading which includes not only the amount of rotation of the reflective element, which the instrument is to measure, but also a spurious signal due to polarization. The same drawback occurs if the rotating polarizer is interposed between the light source and the reflecting mirror. Then the plane of polarization rotates and the polarizing effect of reflection affects the reflected energy at certain orientations which again produces a false reading.

The magnitude of the spurious signal resulting from reflection polarization is, of course, magnified by the number of reflections which take place in the optical path through the instrument and of the beam from the instrument to and back from the reflective element. In other words, when a folded path from the instrument to the reflective element is required the accuracy of the instrument becomes less as opposed to one in which there is a smaller number of reflections or only one.

The magnitude of the suprious signals due to reflection has been sufficiently small so that even in instruments where extreme precision is necessary they can be tolerated and the many advantages in using polarized light has permitted practical operation of such devices. There is, however, a need for greater precision and unfortunately some of the uses where the ultimate in precision is required also necessitate a folded light path so that in the very uses where precision is most important the inaccuracies of the ordinary polarized light autocollimator are at their greatest.

The present invention reduces inaccuracies due to reflection polarization enormously and where nearly monochromatic light can be used eliminates them practically entirely. The error is reduced far below the precision of the rest of the instrument and so permits the design of autocollimators for practical use in fields where the ordinary polarized light autocollimator could not be employed. It is a further advantage of the present invention that it permits folded beam paths without significant loss in precision. It is also an advantage of the invention that the greatly increased precision is obtained with the addition of two very cheap and very rugged elements and does not increase the number of moving parts in the autocollimator at all.

Essentially the present invention instead of producing plane polarized light, the plane of which is rotating, transforms this light into circularly-polarized light which is then retransformed just before detection in the split field analyzer. This is effected with two cheap quarter wave retardation plates, one of which is stationary and one of which rotates. There is no increase in the number of moving parts, however, because the plane polarizer is now fixed. Further advantages in precision and construction will appear in the more detailed description in conjunction with the drawing which is a perspective view, in semi-diagrammatic form, of an autocollimator.

In the drawing a light source is shown at 1 with a conventional set of condensing lenses 2. The condensed beam passes through an optical filter 3 which selects a moderately narrow band of light. The filtered light then passes through a sandwich 4 formed of a plane polarizer and a quarter wave retardation plate suitably oriented so that the light that is plane polarized by passing through one part of the sandwich is transformed into circularly polarized light. The sandwich, not shown in its component parts, is a standard article of commerce and is normally produced in a form which results in right-handed circularly polarized light.

The circularly polarized beam after passing through slit 5 strikes a beam splitter 6 at an angle such that a reflected beam passes out through an objective 11 positioned to collimate the beam. The portion of the radiation passing through the beam splitter is away from the optical axis of the instrument and is trapped and rejected. As the trap is of conventional design it is not shown and for the sake of clarity none of the beam passing through the beam splitter is illustrated. The collimated reflected beam from the beam splitter 6 strikes a rotatable reflective element which is illustrated in the drawings as a mirror 12. This mirror reflects back the beam, still collimated, which again passes through the objective 11 and on through the beam splitting mirror 6. The beam then passes through a correcting plate 7 and then through a rotating quarter wave plate 13. The effect of the rotating quarter wave retardation plate is to retransfer the formerly circularly polarized light into plane polarized light the plane of polarization of which rotates with the rotating plate 13. The rotating plane polarized light then passes through a split field analyzer 8 and is imaged by a lens 9 onto a photoelectric light detector 10.

As in the ordinary polarized light autocollimator which has been described further above the optics of the instrument of the present invention are adjusted so that when the beam reflected from the mirror 12 is exactly parallel to the collimated beam the image produced by the objective 11 on the plane of the split field analyzer 8 will be exactly centered on the dividing line of the two fields. As in the ordinary autocollimator when there is exact alignment there will be no net signal from the photoelectric detector 10 in either phase because, of course, the light passing through the two halves of the split field analyzer fluctuates in intensity in the two fields at 180° to each other. The electrical outputs of the different phases cancel each other and no A.C. signal results. Angular movement of the mirror 12, even in minute amount, will move the image on the analyzer, more energy will go through one field than the other and as a result there will be an alternating current output in phase with the stronger beam. The electrical signals from the photodetector 10 can be used for indicating and/or servo purposes exactly as in an ordinary autocollimator and the circuits are therefore not shown. As a matter of fact the split field analyzer field lens and detector are the same as in the polarized light autocollimator which was hitherto used.

It will be noted that the two reflections which take place in the instrument, namely at the beam splitting mirror 6 and the reflective element 12, do not affect the circular polarized light and hence introduce no spurious signal. This insensitivity to reflection polarization holds true if there are further polarized reflections as in the case of an instrument which used additional mirrors to effect a folded path. If the light were monochromatic circular polarization would be perfect but even for the band produced by the filter the improvement is very marked. The retardation plates are of course cut for the center of the light band used. It is possible to use the instrument without a filter but in this case the circularly polarized beam departs substantially from perfect circular polarization at the ends of the visible spectrum and so, although the effect of reflection polarization is greatly reduced, it is not completely eliminated. For many uses the reduction of spurious signal is sufficiently great so that the instrument operates quite satisfactorily with no filter at all, however, as the light energy available is high the loss of energy by narrowing the band in passing through the filter is inconsequential and so normally an instrument with a filter is preferred. Of course, it would be possible to use a monochromator instead of a filter and produce a band of light which is extremely narrow and where the correction would be almost completely perfect. However, this extreme degree of correction is not needed in practical instruments and hence the added weight and complexity of a monochromator need not be present. In its broadest aspects, however, of course the invention is not concerned with how a narrow band of light of finite width is produced.

The present invention not only reduces to a very great extent spurious signals due to reflections but an additional improvement in accuracy is achieved. In the instruments hitherto used the rotating plane polarizer was ordinarily a disc of a polarizing film. Such discs are cheap and light but it is not practical to produce a film of absolutely uniform polarizing power in all parts of the disc. Therefore, when the disc rotated there was a small fluctuation resulting in an additional but smaller spurious signal. In the present invention the plane polarizing disc is stationary and can be located at a point in the beam where the image is extremely small. This eliminates any error due to nonuniformity.

Practical autocollimators almost always use visible light because of the simplicity of the optics and sensitivity of the detectors. If for any reason it is desired to avoid producing a visible beam from the autocollimator to the reflective element, invisible radiations such as ultraviolet or infrared may be used. Radiations of wave length sufficiently short to accurately obey optical laws will be referred to as "optical radiation."

A fixed plane polarizer and split field analyzer are shown using the cheaper and preferred polarizing films. The invention is in no sense limited thereto and polarizing prismatic means of conventional design may be substituted.

I claim:

1. In a polarized light photoelectric autocollimator comprising in optical alignment a light source, polarizing means, a beam splitter capable of reflecting a portion of the polarized light beam, collimating means in the reflected beam for producing a collimated beam capable of being aimed at a reflecting element the rotational displacement of which about an axis at right angles to the beam striking it is to be measured, a split field analyzer in the image plane of the collimating means and a photoelectric detector, the improvement which comprises
    (a) circularly polarizing means in the beam from the light source to the beam splitter, and
    (b) a rotating quarter wave plate for the band of light used between the beam splitter and the split field analyzer whereby the circularly polarized beam reflected back from the reflecting element is transformed into substantially plane polarized light, the plane of polarization of which rotates.

2. A polarized light, photoelectric autocollimator according to claim 1 in which means are provided, intermediate the light source and the circularly polarizing means, for passing light of a limited band width.

3. A polarized light, photoelectric autocollimator according to claim 1 in which the circular polarization means comprises, in series, a plane polarizing means and a quarter wave plate oriented to transform plane polarized light from the plane polarizer into circular polarized light.

4. A polarized light, photoelectric autocollimator according to claim 3 in which the plane polarizing means and quarter wave retardation plate are in form of a sandwich of two films cemented together.

References Cited in the file of this patent

UNITED STATES PATENTS

| | | |
|---|---|---|
| 2,099,694 | Land | Nov. 23, 1937 |
| 2,341,422 | Bubb | Feb. 8, 1944 |
| 2,651,771 | Palmer | Sept. 8, 1953 |
| 2,998,746 | Gievers | Sept. 5, 1961 |

FOREIGN PATENTS

| | | |
|---|---|---|
| 1,138,768 | France | Feb. 4, 1957 |